United States Patent [19]

van Gilluwe et al.

[11] Patent Number: 4,677,661

[45] Date of Patent: Jun. 30, 1987

[54] MICROPROCESSOR CONTROLLED TELEPHONE UNIT

[75] Inventors: Frank L. van Gilluwe, Sunnyvale; Samuel B. Dunham, Santa Clara; Douglas A. Cross, San Mateo, all of Calif.

[73] Assignee: Baccaret Teledex, Inc., San Jose, Calif.

[21] Appl. No.: 540,136

[22] Filed: Oct. 7, 1983

[51] Int. Cl.⁴ .................. H04M 1/60; H04M 3/54
[52] U.S. Cl. .................. 379/159; 379/164; 379/211; 379/389
[58] Field of Search .......... 179/81 B, 99 M, 99 A, 179/18 AD, 18 BE; 379/159, 164, 165, 211, 389, 157, 156

[56] References Cited

U.S. PATENT DOCUMENTS

| | | | |
|---|---|---|---|
| 4,292,474 | 9/1981 | Morrell et al. | 379/157 |
| 4,293,740 | 10/1981 | Gibb et al. | 379/159 |
| 4,327,256 | 4/1982 | Crooks et al. | 379/156 |
| 4,465,902 | 8/1984 | Zato | 379/61 |
| 4,511,766 | 4/1985 | Shah | 379/157 |
| 4,555,596 | 11/1985 | Blomley | 379/389 |

FOREIGN PATENT DOCUMENTS 0062957 4/1983 Japan ......................... 379/388

OTHER PUBLICATIONS

"Intelligent Telephone Sets", H. Strobel, *Telecommunications*, Dec. 1980, pp. 59-61.
"Ein Telefon mit Komfort", E. Wilke et al., *Funkschau* (Germany), No. 2, 1982, pp. 45-47.

Primary Examiner—Thomas W. Brown
Attorney, Agent, or Firm—Thomas E. Schatzel

[57] ABSTRACT

A telephone unit having a plurality of lines which connect to a PBX and having a microprocessor which transmits and receives data over a digital line between telephone units associated in a group such that a direct forwarding feature is controlled by the microprocessor altering the ring arrangement among the telephones in the group. The telephone unit also has a speakerphone which is controlled by the microprocessor. Each telephone unit has means for monitoring the status of the lines associated with it and providing data to the microprocessor as to line status.

8 Claims, 6 Drawing Figures

Microfiche Appendix Included
(195 Microfiche, 4 Pages)

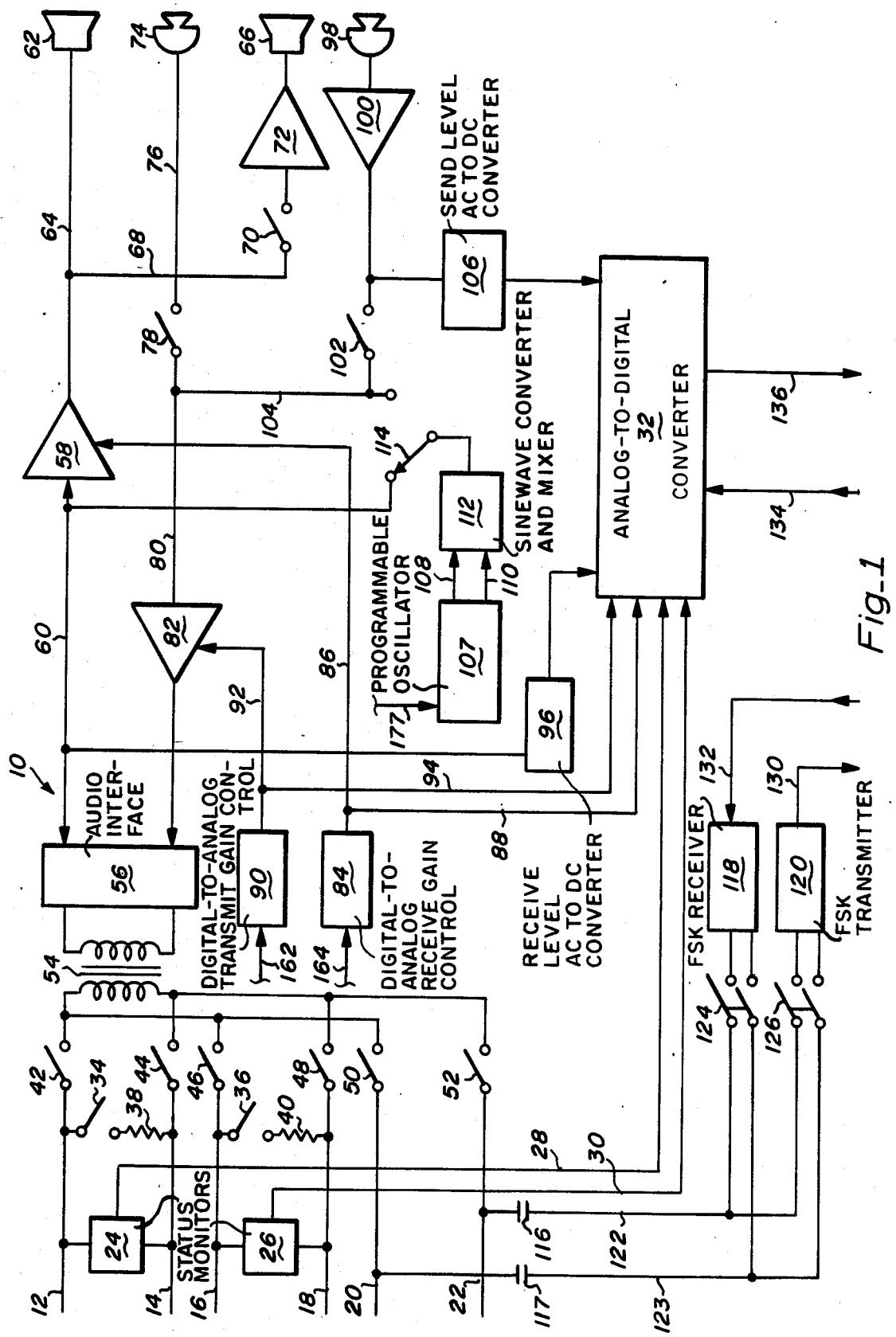
Fig_1

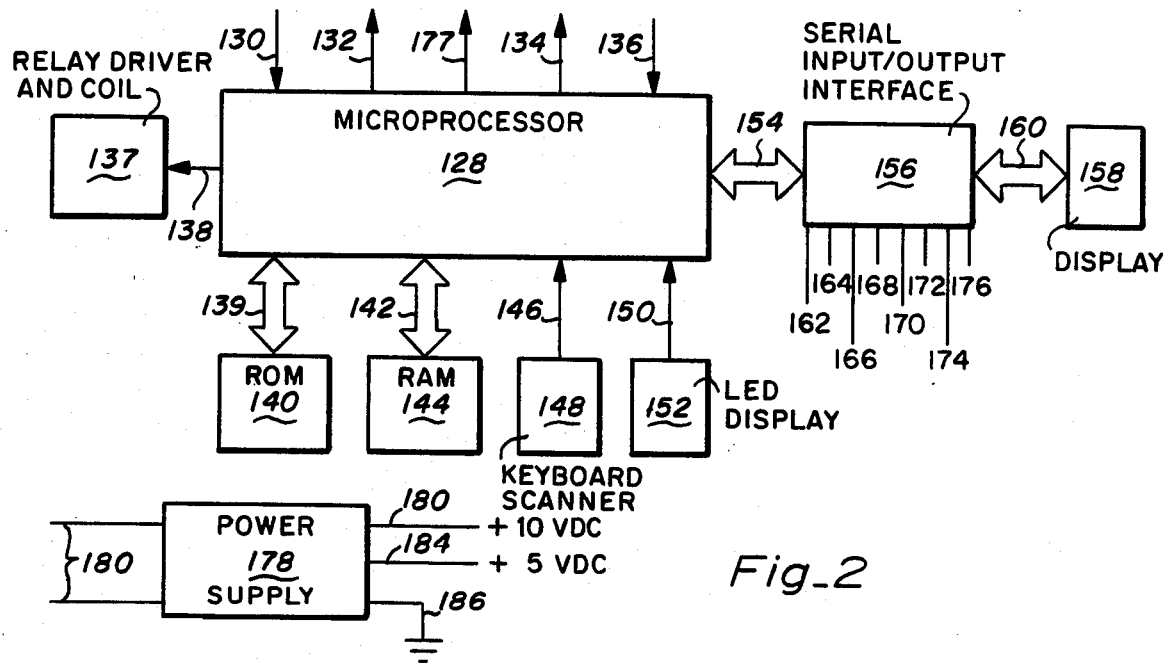
Fig_2
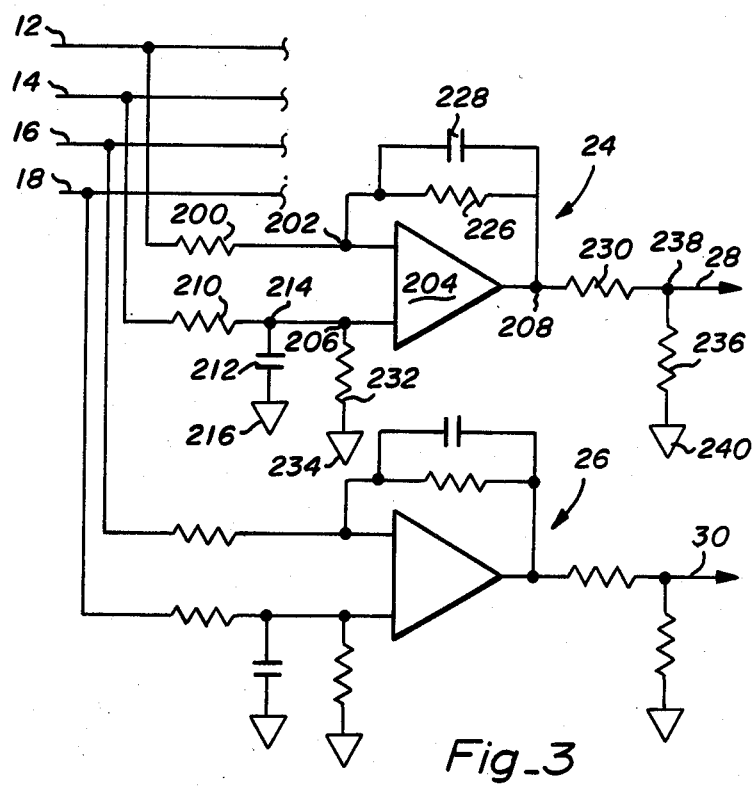
Fig_3

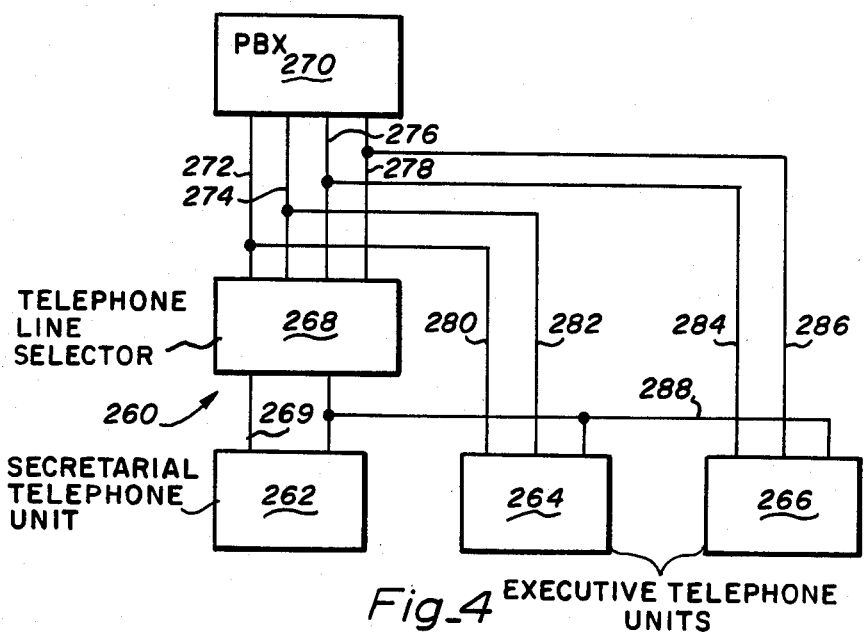
Fig_4
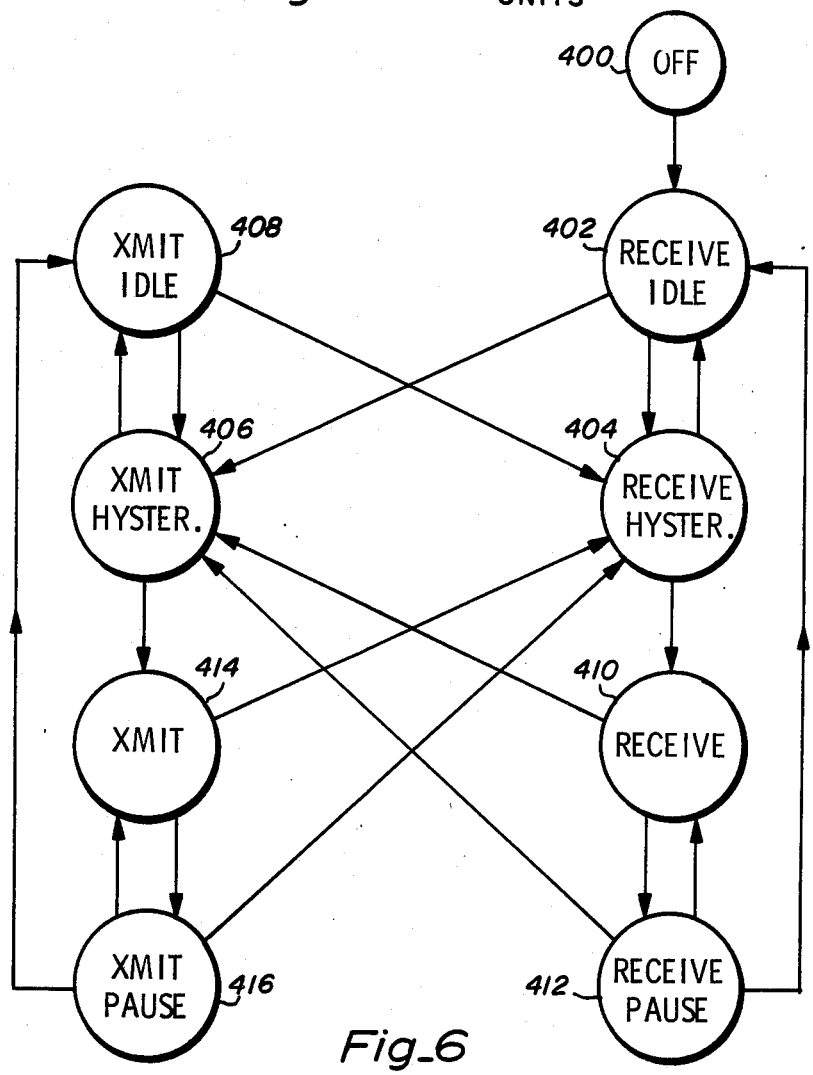
Fig_6

MICROPROCESSOR CONTROLLED TELEPHONE UNIT

A microfiche appendix comprising 192 frames contained on 3 microfiche is part of this application and is on file with the Patent and Trademark Office.

BACKGROUND OF THE INVENTION

1. Field of the Invention

The invention relates generally to telephones and more particularly to a telephone unit with a programmable microprocessor which controls a speaker phone and the means for automatically forwarding calls to another telephone unit within a group of associated telephone units; said telephone unit including a status monitor means by which data is gathered by which the microprocessor determines the status of incoming telephone lines.

2. Description of the Prior Art

In the typical modern business setting, each member of an organization is likely to have a telephone, especially if the member is in a management or public contact position. These telephones are connected to the telephone communications system of the organization which in turn is connected to the system of the telephone company providing telephone service in the area. Thus, within the business there is an internal telephone communications system which receives outside calls and routes them to their proper destination within the organization, processes outgoing calls into the external telephone system for further routing by the telephone company, and permits intraorganizational communications over intercom lines which are usually part of the internal telephone communications system.

While some multi-line systems use key systems where each telephone has all of the outside lines serving the organization, larger internal telephone communications systems use a private branch exchange (PBX) to process incoming, outgoing, and intercom calls. Normally, a business is divided into various suborganizations or departments which may be further broken down by particular responsibilities or functions. Usually staff personnel are assigned to such suborganizations and among other responsibilities are assigned the task of receiving telephone calls for the various members of the suborganization. For simplicity of description, the staff person will be referred to as secretary and the organization members as executives. Under existing telephone communications system, several executives will have a common secretary. The executives usually have their own telephone and the secretary also has a telephone, all of which are interconnected either through the PBX or directly with each other. Depending upon individual desires or business requirements, it is desirable to control which telephone will ring and under what circumstances. Therefore, it is important to be able to coordinate the ring arrangement of the various telephone units. Existing systems are fixed in the changes which can be made to the ringing arrangement.

One of the fixed ring arrangements currently in use is the "duplicate ringing" system where the telephone at the executive and secretarial stations both ring. Usually the secretary is instructed to allow the telephone to ring two or three times to permit the executive an opportunity to answer. After the specified number of rings the secretary will answer the telephone. This setup creates several problems. Where the secretary serves more than one executive, the secretary may be confronted with multiple lines ringing at the same time requiring counting of rings for each, resulting in confusing and potential missed calls or interruption of an executive who has already answered. The "duplicate ringing" system can also cause an inconvenience for the executive. For example, if the executive does not desire to answer because of involvement in a conference with others or other work, the executive still must suffer the specified number of rings interrupting the conference or concentration before the secretary will answer.

Another fixed system currently available is the "delayed ringing" system which is an attempt to eliminate some of the problems associated with the "duplicate ringing" system described above. When a call comes in to a "delayed ringing" system, the executive's phone rings first (the secretary's telephone does not ring at this point). After the specified number of rings (e.g., two or three) the secretary's telephone begins to ring while the executive telephone continues to ring. The ringing of the secretary's telephone indicates that the executive does not desire to answer the call and that the secretary should answer it. This eliminates a need for the secretary to count rings before answering but does nothing to end the interruption to the executive when in conference.

A third fixed system existing in the prior art is an "overflow ringing" system. This is used in a situation where the executive has more than one telephone line. When the executive is using one telephone line and a call comes in on one of the other telephone lines, the additional call will ring at the secretarial station.

Another fixed system is "primary line screening". An executive having two telephone lines can give out the number of one line to a limited number of people to whom the executive wants to speak directly without screening by the secretary. The number of the other line is given to those whose calls the executive desires to have screened. Thus, calls coming in on the first line will ring at the executive station and can be answered directly by the executive. Calls coming in on the second line will ring only at the secretarial station where they can be answered and screened by the secretary.

In an attempt to overcome some of the problems with such ringing arrangements, some telephone systems have a "do not disturb" feature in the PBX. By entering a code involving several keystrokes into the PBX, no calls will be received at the station activating the "do not disturb" feature. However, if an urgent call must be put through, the executive must first disable the "do not disturb" function by entering several keystrokes before being able to receive the call. This is awkward and time consuming and as a result the feature tends not to be used.

Another feature sometimes available is a "call forwarding" function. This permits an executive to have calls forwarded to another number. Again this feature as contained in the PBX requires between five and nine keystrokes per activation or deactivation. Like the "do not disturb" feature, "call forwarding" is slow and cumbersome to use. An example of a telephone containing various call transferring features which are controlled by a microprocessor is discussed in U.S. Pat. No. 4,298,775 issued to Norman R. Buck, et al.

Speakerphones are well known in the art. Generally, the speakerphone permits only one way communication, switching between transmit and receive depending on which party is speaking the loudest. None of the existing speakerphones use microprocessors contained in the telephone set to control the audio path switching of the speakerphone. As a result, more hardware is needed for the speakerphone, ease of manufacture is reduced and no consideration is given to the relative normal volume of the voices of the parties to a speakerphone conversation.

SUMMARY OF THE PRESENT INVENTION

It is therefore an object of the present invention to provide a telephone unit with a ring arrangement which can be varied and controlled by a microprocessor.

It is a further object to provide a telephone unit with a ring arragement which can be varied by the operation of a single button.

It is a further object to provide a telephone unit with digital lines connecting the telephone units of a telephone group independent of a PBX.

It is a further object to provide a telephone unit with a speakerphone controlled by a microprocessor.

It is a further object to provide a telephone unit with a speakerphone which requires less hardware for construction.

It is a further object to provide a telephone unit with a speakerphone which is easy to manufacture.

It is a further object to provide a telephone unit with a means for monitoring the status of incoming telephone lines and producing a signal corresponding to such status for use by a microprocessor.

Briefly, a preferred embodiment of the present invention includes a plurality of telephone units each containing a microprocessor which are linked together over digital lines to form a work group comprising executive and secretarial telephones. Each executive telephone unit has one or more analog lines connected to a PBX through a telephone line selector. Each secretarial telephone unit is connected to the PBX through the telephone line selector such that the secretarial unit can connect to any analog line running between the PBX and an executive telephone unit. Each executive telephone unit has a speaker phone associated with it.

There are a plurality of manually activated buttons which are used to select various features associated with the telephone. In addition to such well known features as speed dialing and automatic redialing of the last number called, each telephone unit has a direct forwarding feature which modifies the existing ring arrangement and causes incoming calls to ring at a predetermined station when the feature is activated. Any one of the ring arrangements described above can be set up at the time the system is installed. (The various ring arrangements may be altered by entering signals which direct a change from one arrangement to the other at times subsequent to installation.)

The fixed ring arrangement for each executive telephone can be different from the other executive units depending on the desires of the executive. The following description is based on the assumption that the fixed ring arrangement is such that an incoming call will ring at the executive's station. Activation of the direct forwarding feature of the present invention by depressing a single button on the executive unit causes all incoming calls on lines associated with that executive unit to ring only at the secretarial unit. This feature is useful at times when the executive wishes not to be disturbed or is leaving the vicinity of the executive unit by having the line ring at a location where it will be answered.

The secretarial telephone unit may also have the direct forwarding feature in which case calls which would normally ring at the secretarial station and calls for executives with direct forwarding in effect will ring at a predefined extension (e.g., a central message station) when the feature is in operation.

By depressing the single button again, the direct forwarding feature is deactivated and the ring arrangement previously in effect is restored.

The direct forward feature is accomplished by use of a microprocessor in each telephone unit. When the direct forwarding button is initially depressed, it is sensed and a signal transmitted to the microprocessor which is programmed to monitor the incoming lines on the unit which is in direct forwarding. When an incoming call is detected, a signal is sent to the microprocessor of the appropriate telephone unit which directs that unit to ring rather than the unit in direct forwarding. When the direct forwarding button is depressed again, it is sensed and a signal transmitted to the microprocessor which causes the ring arrangement to return to that configuration it was in prior to the activation of direct forwarding.

When the speakerphone is selected for operation, the circuitry associated with the speakerphone which switches the speakerphone between transit and receive is controlled by the microprocessor. The microprocessor is programmed to decide when the speaker should be in the transmit or receive mode. By using the microprocessor, the decision as to when to switch modes is made more intelligently than with conventional speakerphones and eliminates the need for the hardware associated with such speakerphones, thus making manufacture easier.

A status monitor includes a differential amplifier which senses voltage across incoming telephone line wire pairs and provides an output signal which when converted to a digital signal is used by the microprocessor to control the telephone unit and transmit data to other telephone units in the group.

An advantage of the telephone unit is that the ring arrangement can be changed by the operation of one button.

Another advantage is that the telephone unit has a ring arrangement which is controlled by a microprocessor.

A further advantage is that digital lines connect the telephone units of a work group independent of a PBX.

A further advantage is that the speakerphone is controlled by a microprocessor.

A further advantage is that the speakerphone reduces the hardware necessary for construction.

A further advantage is that the speakerphone is easier to manufacture than conventional speakerphones.

A further advantage is that a status monitor means provides signals relating to the status of incoming telephone lines which is used by the microprocessor to control the telephone unit.

These and other objects and advantages of the present invention will no doubt become obvious to those of ordinary skill in the art after having read the following detailed description of the preferred embodiment as illustrated in the various drawing figures.

IN THE DRAWING

FIG. 1 is a schematic diagram showing one portion of the circuitry of a telephone set of the present invention;

FIG. 2 is a block schematic diagram showing another portion of the circuitry of a telephone set of the present invention;

FIG. 3 is a circuit diagram showing the status monitor portion of a telephone set of the present invention;

FIG. 4 is a block diagram showing a configuration for a telephone work group using telephone sets of the present invention;

FIG. 6 is a flow chart of a program used by the speakerphone features of the present invention.

DETAILED DESCRIPTION OF THE PREFERRED EMBODIMENT

Figure 5:
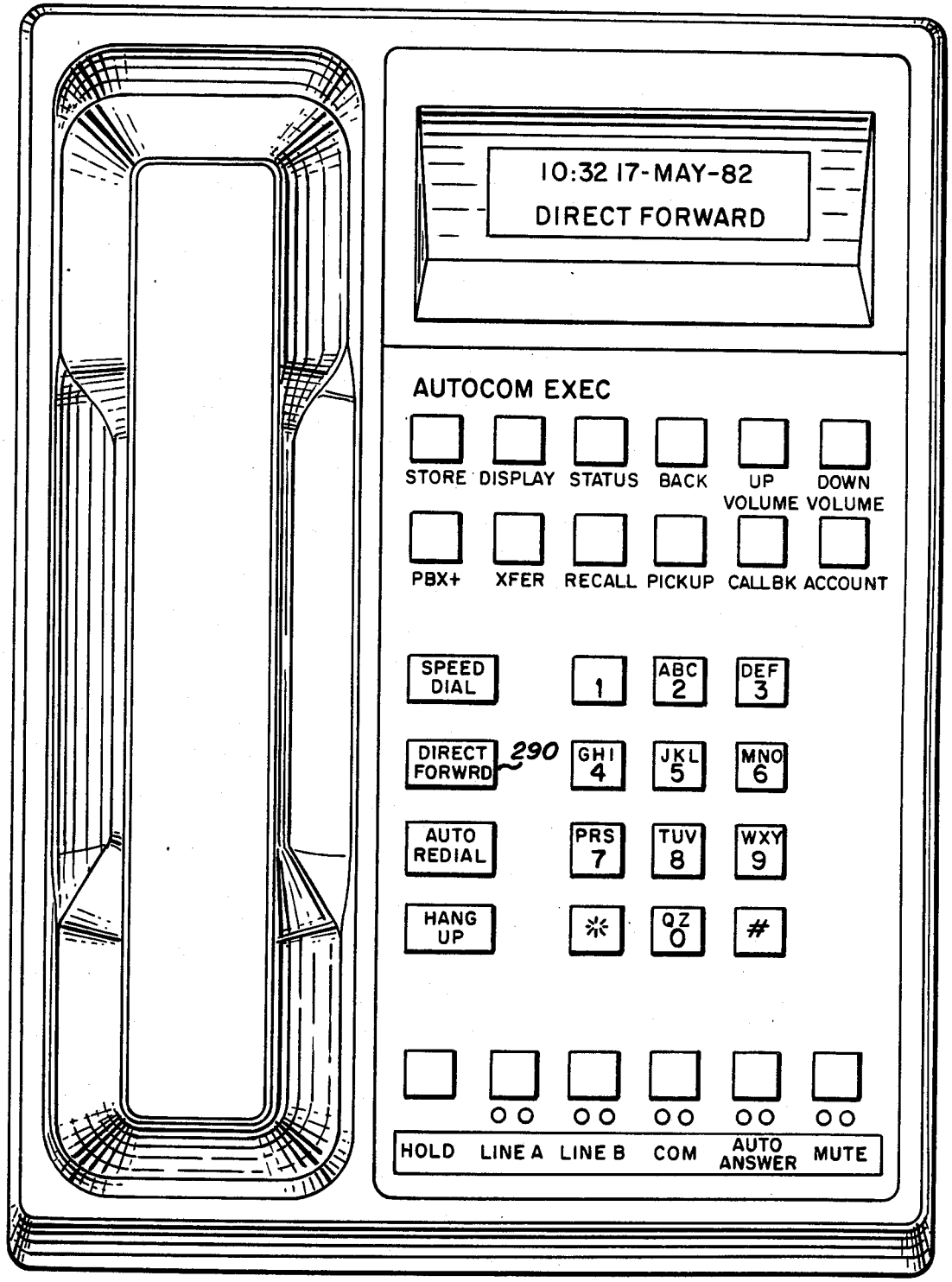
FIG. 5 is a view showing the exterior of a telephone set of the present invention.

In FIGS. 1 and 2, there is illustrated a telephone system referred to by the general reference character 10 and incorporating the present invention. Incoming and outgoing calls are carried over a pair of wires 12 and 14, and 16 and 18, respectively. Intercom communications take place over a pair of lines 20 and 22. Connected between wires 12 and 14 is a status monitor 24 and between wires 16 and 18 is a status monitor 26. The outputs of status monitors 24 and 26 are transmitted by a pair of lines 28 and 30, respectively, to an analog-to-digital converter 32. Also connected between wires 12 and 14 and 16 and 18 are a pair of hold switches 34 and 36 in series with a pair of resistors 38 and 40, respectively. Each wire 12, 14, 16, 18, 20 and 22 is connected to a respective switch 42, 44, 46, 48, 50 and 52 which in turn connect said wires to the primary of a transformer 54.

The secondary of transformer 54 is connected to an audio interface 56, which in turn is connected to receive amplifier 58 by a lines 60. Receiver amplifier 58 is connected to a handset earpiece 62 by a line 64 and to a speakerphone speaker 66 over a line 68 through a speakerphone speaker switch 70 and a speakerphone speaker amplifier 72.

Outgoing signals are received by audio interface 56 from a telephone handset microphone 74 over a line 76 through a handset microphone switch 78 and over a line 80 through a transmit amplifier 82. A digital-to-analog receive gain control 84 is connected to receive amplifier 58 over a line 86 and to analog-to-digital converter 32 over a line 88. Similarly, a digital-to-analog transmit gain control 90 is connected to transmit amplifier 82 and analog-to-digital converter 32 by lines 92 and 94, respectfully. A receive level AC to DC converter 96 is connected between line 60 and analog to digital converter 32.

A telephone speaker microphone 98 is connected to a speaker microphone amplifier 100 which connects to line 80 through a speaker microphone switch 102 over a line 104. A send level AC-to-DC converter 106 is connected between the output of speaker microphone amplifier 100 and analog to digital converter 32.

A programmable oscillator 107 provides a first output 108 and a second output 110 to a sinewave-converter-and-mixer 112 which is connected to an digital controlled analog switch 114 which connects to the input of either receive amplifier 58 or transmit amplifier 82 over line 60 and 80, respectively.

Intercom lines 20 and 22 are connected through a capacitors 116 and 117 to an FSK receiver 118 and an FSK transmitter 120 over line 122 which includes switches 124 and 126. FSK receiver 120 is connected to a microprocessor 128 (see FIG. 2) by a line 130. Similarly a line 132 connects microprocessor 128 to FSK transmitter 118. Microprocessor 128 is also connected to analog-to-digital converter 32 by line 134 and 136.

A relay driver and coil 137 is connected to microprocessor 128 (see FIG. 2) by a line 138. A bus 139 connects microprocessor 128 with a ROM 140. A bus 142 connects microprocessor 128 with a RAM 144. A line 146 connects microprocessor 128 to a keyboard scanner 148. A line 150 connects microprocessor 128 to an LED display 152.

A multilead 154 connects microprocessor 128 with a serial input/output interface 156. The interface 156 is connected with a display 158 by a multilead 160. A plurality of lines 162, 164, 166, 168, 170, 172, 174 and 176 are connected to interface 156. Lines 166, 168, 170, 172, 174, and 176 are connected to digital controlled analog switches 78, 102, 114, 126, 124 and 70 respectively. A line 177 connects microprocessor 128 to programmable oscillator 107.

A power supply 178 is provided with an input lead pair 180 and a +10 VDC output 182, a +5 VDC output 184 and a path to ground 186.

The circuit components of the status monitors 24 and 26 are illustrated in FIG. 3. A first resistor 200 is connected between wire 12 and a first input terminal 202 of a differential amplifier 204 which also has a second input terminal 206 and an output terminal 208. A second resistor 210 is connected between wire 14 and a second input terminal 206. A capacitor 212 is connected between a terminal 214 and a path to ground 216. A third resistor 226 is connected between first input terminal 202 and output terminal 208. A capacitor 228 is connected between first input terminal 202 and output terminal 208. A fourth resistor 230 is connected to output terminal 208. A fifth resistor 232 is connected between a second input terminal 206 and a ground 234. A sixth resistor 236 is connected between a first terminal 238 of fourth resistor 230 and a ground 240. Line 28 is also connected to terminal 238.

Status monitor 26 connected between wires 16 and 18 and line 30 is of identical construction as status monitor 24 described above.

In FIG. 4 there is illustrated a telephone group 260. Group 260 as illustrated is composed of a secretarial telephone unit 262 and a first and a second executive telephone unit 264 and 266. Although only three telephone units are shown associated with telephone group 260, a greater or lesser number may be employed. Each telephone unit 262, 264 and 266 include the structure and components of telephone 10 as described above. Telephone unit 262 is connected to a telephone line selector 268 by a secretarial line 269. A telephone line selector is disclosed in U.S. patent application Ser. No. 540,135, filed Oct. 7, 1983, by the same inventors as the present application. The telephone line selector 268 is connected to a PBX 270 by telephone lines 272, 274, 276 and 278. Connected to the telephone line 272 between telephone line selector 268 and PBX 270 is a first executive line 280 which is connected to telephone unit 264. Connected to telephone line 274 between telephone line selector 268 and PBX 270 is a second executive line 282 which is also connected to telephone unit 264. In a similar manner third and fourth executive lines 284 and 286 connect telephone unit 266 to telephone lines 276 and 278, respectively, between telephone line selector 268 and PBX 270. An intercom line 288 connects telephone units 262, 264 and 266 with each other.

Taking telephone unit 264 as an example, the first executive line 280 is composed of wires 12 and 14 and second executive line 282 is composed of wires 16 and 18 (see FIG. 1). Intercom line 288 is comprised of wires 20 and 22.

The outer appearance of a typical telephone unit is shown in FIG. 5. A telephone unit of such configuration such as telephone unit 264 has a direct forward button 290 along with the conventional numerical keyboard shown.

For the purpose of describing the operation of the present invention it will be assumed that telephone group 260 is in one of the ring arrangements discussed above such that the first executive telephone unit 264 will ring when a call comes in over line 280 or 282. PBX 270 is of conventional design and is connected to the telephone lines operated by a commercial telephone company. Upon receiving an incoming call for first executive line 280, the call is directed to line 272 and on to line 280.

Referring to FIG. 1, status monitor 24 senses the change in voltage across wires 12 and 14, as will be discussed below, caused by the presence of an incoming call. The status monitor 24 generates an analog signal which is sent over line 28 to analog-to-digital converter 32 where it is converted into a digital signal. Microprocessor 128 is programmed to request data which has been processed by the analog-to-digital converter periodically and thus the digital signal corresponding to the voltage change sensed by status monitor 24 is received by microprocessor 128. Upon processing the data received from status monitor 24, microprocessor 128 determines that an incoming call is present on wires 12 and 14 and sends a signal to relay driver and coil 137 over line 138. Relay driver and coil 137 then sends a signal to close connection switches 42 and 44 which connect wires 12 and 14 to transformer 54. Through transformer 54 the incoming call enters the audio interface 56.

At the same time, the microprocessor 128 sends a signal through serial input/output interface 156 over output lead 177 to programmable oscillator 107 where a ring tone is produced and directed through sinewave converter and mixer 112 to the input of receive amplifier 58 through digital controlled analog switch 114 which has been appropriately positioned by a signal from microprocessor 128 through serial input/output interface 156 over output line 170.

The ring tone passes through receiver amplifier 58 over lines 64 and 68 through speaker phone switch 70 which has been closed by a signal from microprocessor 128 through serial input/output interface 156 over output line 176. The ring tone then passes through speakerphone amplifier 72 and is broadcast through phone speaker 66 where an audible signal alerts persons in the vicinity that an incoming call is present. At the same time, an LED status light (not shown) is activated by microprocessor 128 through LED display 152 to visually indicate that there is an incoming call present.

When the user answers the phone and a conversation ensues, the audio interface 56 separates the incoming and outcoming audio signals in a hybrid circuit. The gain of the transmit amplifier 82 is adjusted by a signal from digital to analog receive gain control 84 which is controlled by a signal from the microprocessor 128 through serial input/output interface 156 over output lead 162. The microprocessor 128 is programmed to compensate for component manufacturing variances. The gain for receive amplifier 58 can also be adjusted through microprocessor 128. The user can adjust the gain up or down by using buttons on the telephone unit (see FIG. 5). Activation of such a button is sensed by a keyboard scanner 148. Said scanner 148 transmits data to microprocessor 128 where the microprocessor is programmed to send a signal to digital to analog receive gain control 84 to raise or lower the volume of the signal being received by the telephone unit 264. When a user of executive telephone unit 264 desires to have incoming calls not ring at the executive telephone unit 264, the direct forward button 290 is depressed. This allows the executive to conduct a conference without being interrupted or to leave the vicinity of telephone unit 264 and be sure that incoming calls would be answered at another location.

When direct forward button 290 is depressed, it is detected by the keyboard scanner 148 which is controlled by microprocessor 128 which is programmed to activate the scanner 148. The technique used to scan the keyboard is well known and involves uses of pull down resistors in a sequential search of the rows and columns of a matrix the intersection points of which represent the various keys and buttons on the keyboard. After detecting that a button has been depressed, the microprocessor 128 initiates a search to determine which particular button has been depressed. In this instance the keyboard scanner 148 will determine that direct forward button 290 has been depressed. That information is then transferred to microprocessor 128 which is programmed to change the ringing arrangement. The fact that telephone 264 is now in a direct forward mode is transmitted to the secretarial telephone unit 262 and the telephone line selector 268 over intercom line 288 which also acts as a path for the transfer of digital data among the various telephone units 262, 264 and 266 and telephone line selector 268. The digital data to be communicated over intercom line 288 is transmitted from microprocessor 128 over lines 132 to FSK transmitter 118 through switch 124 which has been appropriately closed by microprocessor 128 through serial input/output interface 156 over output line 174. The data then is transmitted over line 122 through capacitor 116 and onto wires 20 and 22 which comprise intercom line 288. In a like manner, digital data received from the other telephone units 262 and 266 or telephone line selector 268 is transmitted over line 122 through switch 126 which has been appropriately closed by microprocessor 128 through serial input/output interface 156 over output line 172, and through FSK receiver 120 to microprocessor 128 over line 130. The FSK and voice transmission over intercom lines 20 and 22 are separated into frequency bands. Capacitors 116 and 117 act as high pass filters to eliminate the audio signal from the digital signal. The audio interface 56 and to some extent, transformer 54, act as low pass filters to eliminate the digital signal from the audio signal.

The operation of telephone 10 as a speakerphone involves the control of when to switch the phone from a receive mode to a transmit mode and vice versa. As in other typical speakerphones, the present invention is a one-way device. This means that only one party to a conversation can be heard at a time (i.e., control the mode in which the speakerphone operates). The present invention uses microprocessor 128 to make the decision as to when to switch between modes.

The microprocessor 128 controls the shift in modes by opening and closing switches 70 and 102 by means of signals over output lines 176 and 168 respectively. The data used by microprocessor 128 to make the decision when to switch modes is received from two sources. A signal (receive level) corresponding to the audio signal level being received is taken between audio interface 56 and receive amplifier 58. The receive level signal is passed through the receive level AC-to-DC converter 96 where the analog AC signal is rectified to an analog DC signal and filtered. The output of converter 96 is then fed to analog-to-digital converter 32 where the signal is converted to a digital signal and then transmitted to microprocessor 128 over line 136.

In a similar manner a send level signal is taken between speakerphone microphone amplifier 100 and speaker microphone switch 102. The send level signal then passes through send level AC-to-DC converter 106 and analog-to-digital converter 32 from which the send level signal is transmitted to microprocessor 128 over line 136.

FIG. 6 is an illustration of the various states in which the speakerphone feature will operate depending on the send or receive levels processed by microprocessor 128. The microprocessor 128 is programmed to change states as will be discussed below. When the speakerphone feature is selected for use by the user, the system will change from an off state 400 to a receive idle state 402. In receive idle state 402 neither party has started to talk, and the microprocessor 128 is waiting for the first party to speak before deciding whether the system should be in a send or receive condition. The first party to talk will control the initial condition in which the speakerphone will operate. The first level signal, either receive or send, transmitted to microprocessor 128 will cause the system to shift to either a receive hysteresis state 404 or a transmit hysteresis state 406. The hysteresis states 404 and 406 are extremely short lived and are provided to allow the microprocessor to determine whether or not the system is really receiving or transmitting a voice signal. For example, where a noise or impulse may cause the shift out of receive idle 402, the microprocessor 128 would recognize the lack of a continued level and return the system to the receive idle state 402 or transmit idle state 408, depending on whether the initial shift out of receive idle 402 was into receive hysteresis 404 or transmit hysteresis 406.

Assuming that the system has shifted from receive idle 402 to receive hysteresis 404 and that a continued receive level is seen by microprocessor 128, the system will shift to a receive state 410. In the receive state 410, microprocessor 128 causes switch 70 to close so that the speakerphone can receive but cannot transmit. As long as the non-user speaker continues to talk, the system will remain in the receive state 410, preventing the user from being heard by the non-user, except in circumstances which will be described below.

During normal conversations there are natural pauses. These may appear between syllables, words, sentences, etc. If as soon as the system sensed the absense of a level it shifted out of the receive state 410, the non-user speaker could be cut off in mid-sentence. To avoid this possibility the system is programmed to shift into a receive pause state 412 when an absense of receive level is sensed by microprocessor 128. If the non-user begins to speak again the system will revert to the receive state 410. If the non-user does not speak for a predetermined interval indicating that this is not merely a pause but the end of a communication, the system will shift into the receive idle state 402 from which the process described above is repeated. A transmit 414 and a transmit pause state 416 shown on FIG. 6 correspond to receive 410 and receive pause 412 respectively, and function in a similar manner.

The microprocessor 128 computes a short term and long term average of the amplitude of signal level (either send or receive) while one party is speaking. This is accomplished by taking samples over a short period for the short term and over a greater period for the long term average. The process is repeated as the speaker continues to talk. In this manner short term peaks in signal level can be identified rapidly. The short term average is used in the idle states 402 and 408 to rapidly detect the presense of a signal level and shift the system into a hysteresis state 404 or 406.

The long term average is used in the receive and transmit states 410 and 414 as described below. Many spoken words have inaudible portions which if the speakerphone feature was overly sensitive might be interpreted as "pauses" which would cause the system to shift to one of the pause states 412 or 416. Such shifts could result in a clipping of words and in general deteriorate the performance of the speakerphone feature. To avoid this problem the long term average is used by microprocessor 128 when in the receive or transmit states 410 or 414 to determine whether a "pause" has occurred requiring a shift to pause state 412 or 416. Only if the long term average falls below a predetermined level will the shift to the pause states 412 or 416 occur.

The microprocessor 128 is programmed to permit a shift between speakers under certain circumstances when the system is in either receive 410 or receive pause 412 or transmit 412 and transmit pause 416. When the speaker not in control speaks in a raised voice (as might be used when interrupting someone) the microprocessor 128 will shift to the opposite hysteresis state 404 or 406 to permit the interrupting speaker to take control if this interrupting level is sufficiently in excess of the present speaker's level. From there, the system will shift to an idle state 402 or 408 or a receive or transmit state 410 or 414 depending on the signal level seen by microprocessor 128 as previously discussed.

A program for microprocessor 128 in accordance with preferred embodiment of the present invention is set forth in the microfiche appendix references above. The program was written for use with an INTEL 8051 microprocessor and it should be noted that other microprocessors can be used with appropriate modifications of the program.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A telephone unit comprising, in combination,
    a plurality of incoming telephone lines connected from a PBX and a telephone line selector;
    a plurality of status monitor means for individually monitoring the status of each of said incoming telephone lines and generating a signal corresponding to said status;
    a digital path linking said first named telephone unit with other telephone units and the telephone line selector which are associated in a telephone work group such that telephone status data can be transmitted and received by each telephone unit in the group;

a programmable microprocessor which receives and transmits telephone status data over said digital path;

a digital transmission and reception means comprised of an FSK receiver and transmitter connected intermediate said digital path and said microprocessor for transmitting and receiving said telephone status data;

direct forwarding means comprising a single manual button on said first named telephone unit which when activated causes transmission of telephone status data to a microprocessor of each telephone unit of the telephone group and the telephone line selector which are connected by said digital path such that all incoming calls on the incoming telephone lines of said first named telephone unit will ring at predetermined secretarial telephone units within said group, and after deactivation of said manual button an incoming call will ring at said first named telephone unit and will not ring at the predetermined units; and a speakerphone means.

2. The telephone unit of claim 1, wherein:

said speakerphone means is connected by said programmable microprocessor of said first named telephone unit such that said first named telephone unit is switched between transmit and receive modes automatically.

3. The telephone unit of claim 1, further comprising:

a filter connected intermediate said digital path and said digital transmission and reception means for filtering out audio signals;

an audio interface connected intermediate said digital path and said incoming telephone lines and said speakerphone means for filtering out digital signals from said digital path and allowing only audio signals from said digital path to reach said speakerphone; and wherein said digital path is over an intercom line which connects said telephone units within the telephone group with every other telephone unit within the group and with the telephone line selector and can simultaneously carry digital data at one frequency band and voice communication at another frequency band.

4. The telephone unit of claim 1, wherein:

said status monitor means are electronic circuits including a differential amplifier which senses voltage across incoming telephone line wire pairs and produces an analog signal which when converted to a digital signal is used by said programmable microprocessor of said first named telephone unit to determine the status of one of said incoming telephone lines.

5. A direct forwarding device in a telephone unit associated with a plurality of other telephone units in a telephone group which is connected to outside telephone lines through a telephone system containing a PBX and a telephone line selector comprising:

a button on a keyboard which can be manually activated and deactivated;

a keyboard scanning means to detect activation of said button;

a programmable microprocessor which controls said scanning means and causes transmission of a signal over a digital path to microprocessors in said plurality of other telephone units and the telephone line selector which causes incoming calls to stop ringing at a first named telephone unit and to ring at a predesignated, secretarial telephone unit in the telephone group and not at said first named telephone unit, when said direct forwarding device is deactivated by subsequent deactivation of said button, then the incoming calls will resume ringing at said first named telephone unit; and an FSK receiver and transmitter connected intermediate said digital path and said microprocessor for transmitting and receiving said signal.

6. The direct forwarding device of claim 5, wherein:

said digital path is over an intercom line which connects said telephone unit of the telephone group and the telephone line selector with every other telephone unit in said group.

7. The device of claim 1, wherein:

there is an analog-to-digital converter connected intermediate said plurality of status monitor means and said programmable microprocessor of said first named telephone unit.

8. The device of claim 7, wherein each of said status monitor means comprises:

a differential amplifier;

a first resistor connected intermediate a first wire of one of said telephone lines and a first input of said differential amplifier;

a second resistor connected intermediate a second wire of said telephone line and a second input of said differential amplifier;

a third resistor connected intermediate the second input of said differential amplifier and ground;

a first capacitor connected parallel to said third resistor;

a fourth resistor connected intermediate the first input and an output of said differential amplifier;

a second capacitor connected parallel to said fourth resistor;

a fifth resistor connected intermediate the output of said differential amplifier and said analog-to-digital converter; and whereby a range of voltage changes are detected across said telephone line and a corresponding analog signal is produced such that the telephone unit can detect a variety of PBX telephone line status signals.

* * * * *